United States Patent
Chen

(10) Patent No.: US 8,060,332 B2
(45) Date of Patent: Nov. 15, 2011

(54) METHOD FOR TESTING SENSOR FUNCTION AND COMPUTER PROGRAM PRODUCT THEREOF

(75) Inventor: Chung-Nan Chen, Taipei (TW)

(73) Assignee: Inventec Corporation, Taipei (TW)

( * ) Notice: Subject to any disclaimer, the term of this patent is extended or adjusted under 35 U.S.C. 154(b) by 357 days.

(21) Appl. No.: 12/466,702

(22) Filed: May 15, 2009

(65) Prior Publication Data

US 2010/0256944 A1 Oct. 7, 2010

(30) Foreign Application Priority Data

Apr. 7, 2009 (TW) .............................. 98111486 A

(51) Int. Cl.
G01C 25/00 (2006.01)
G01N 37/00 (2006.01)
G01D 18/00 (2006.01)
G06F 11/00 (2006.01)
G06F 11/14 (2006.01)
G01R 31/00 (2006.01)

(52) U.S. Cl. .......... 702/116; 702/81; 702/104; 702/183; 324/512; 714/25

(58) Field of Classification Search ................ 702/57, 702/58, 59, 64, 81–84, 104, 116, 182–186, 702/188; 324/512, 537, 750.01, 750.14; 700/108–110; 714/11, 25, 30, 36, 37, 48; 713/340, 320
See application file for complete search history.

(56) References Cited

U.S. PATENT DOCUMENTS

| 6,496,790 B1 * | 12/2002 | Kathavate et al. | 702/188 |
| 7,188,275 B2 * | 3/2007 | Ortiz et al. | 714/27 |
| 7,844,866 B2 * | 11/2010 | Austen et al. | 714/57 |

* cited by examiner

Primary Examiner — Michael Nghiem
Assistant Examiner — Ricky Ngon
(74) Attorney, Agent, or Firm — J.C. Patents

(57) ABSTRACT

A sensor function testing method and a computer program product thereof are provided. In the present method, a rearm type corresponding to a rearm function of a sensor in a server is obtained, wherein the sensor is in a normal status or one of a plurality of failure statuses. Then, the sensor is respectively triggered to enter and exit each of the failure statuses. If the rearm type is an auto rearm type and the sensor automatically returns to the normal status every time when the sensor is triggered to exit one of the failure statuses, the rearm function is determined as normal. If the rearm type is a manual rearm type and the sensor only returns to the normal status after receiving a rearm instruction every time when the sensor is triggered to exit one of the failure statuses, the rearm function is determined as normal.

14 Claims, 2 Drawing Sheets

METHOD FOR TESTING SENSOR FUNCTION AND COMPUTER PROGRAM PRODUCT THEREOF

CROSS-REFERENCE TO RELATED APPLICATION

This application claims the priority benefit of Taiwan application serial no. 98111486, filed Apr. 7, 2009. The entirety of the above-mentioned patent application is hereby incorporated by reference herein and made a part of this specification.

BACKGROUND OF THE INVENTION

1. Field of the Invention

The present invention generally relates to a method for testing a function of a sensor, and more particularly, to a method for testing a rearm function of a sensor and a computer program product thereof.

2. Description of Related Art

A server usually plays a very important role in maintaining the operations of a system because of the high stability and performance thereof. Accordingly, it is very important to effectively monitor the status of a server. Sensors are generally disposed in a server for reflecting the healthiness of the server in different aspects (such as temperature, voltage, fan speed, and power supply, etc).

When a sensor detects an unusual variation in the environment, it issues an assertion event, and the sensor itself enters a failure status. However, the sensor has to be rearmed by a firmware regardless of whether the sensor issues a de-assertion event or the sensor itself returns from the failure status back to a normal status when the environmental variation is back to normal. The rearm type of the sensor may be an auto rearm type or a manual rearm type. Because the rearm type of a sensor is defined in a firmware, it is very important to test whether a sensor of the auto rearm type can automatically return to the normal status and whether a sensor of the manual rearm type can return to the normal status after receiving a rearm instruction during the development of a server.

Presently, a server may have hundreds of sensors, and each of the sensors may have many different failure statuses. Thus, the rearm function of a sensor is usually tested regarding several failure statuses of the sensor. However, such a method cannot make sure that the sensor can always return to the normal status from any failure status. However, it costs too much time and human effort to test the sensor regarding each failure status thereof, and some failure statues (for example, the one caused by an internal error of a central processor) are very difficult to be discovered.

SUMMARY OF THE INVENTION

Accordingly, the present invention is directed to a sensor function testing method, wherein the rearm function of each sensor in a server can be tested regarding all the failure statuses of the sensor.

The present invention is directed to a computer program product, wherein at least one program instruction recorded in the computer program product can be loaded into and executed by a server for testing the rearm function of each sensor in the server.

The present invention provides a sensor function testing method for testing a rearm function of a sensor in a server, wherein the sensor is in a normal status or one of at least one failure status. In the present method, a rearm type corresponding to the rearm function of the sensor is first obtained. Then, the sensor is respectively triggered to enter and exit each of the failure statuses. If the rearm type is an auto rearm type and the sensor returns to the normal status every time when the sensor is triggered to exit one of the failure statuses, the rearm function of the sensor is determined as normal. If the rearm type is a manual rearm type and the sensor only returns to the normal status after receiving a rearm instruction every time when the sensor is triggered to exit one of the failure statuses, the rearm function of the sensor is determined as normal.

According to an embodiment of the present invention, the server includes a baseboard management controller (BMC), and the step of obtaining the rearm type corresponding to the rearm function includes reading a sensor data record (SDR) in the BMC to identify the rearm type of the sensor. Besides, the SDR further records a mapping relationship between the sensor and the normal and failure statuses.

According to an embodiment of the present invention, the step of respectively triggering the sensor to enter each of the failure statuses includes determining whether the sensor is already in one of the failure statuses after the sensor is triggered to enter the failure status. If the sensor is not in the failure status, a status control function of the sensor is determined as abnormal.

According to an embodiment of the present invention, after the step of determining whether the sensor is already in the failure status, the sensor function testing method further includes triggering the sensor to exit the failure status if the sensor is already in the failure status and determining whether the sensor returns to the normal status. If the rearm type of the sensor is the auto rearm type and the sensor does not return to the normal status, the rearm function of the sensor is determined as abnormal. If the rearm type is the manual rearm type and the sensor automatically returns to the normal status, the rearm function of the sensor is determined as abnormal.

According to an embodiment of the present invention, after the step of determining whether the sensor returns to the normal status, the sensor function testing method further includes transmitting the rearm instruction to the sensor when the rearm type is the manual rearm type and the sensor does not return to the normal status and determining the rearm function of the sensor as abnormal when the sensor receives the rearm instruction and cannot return to the normal status.

According to an embodiment of the present invention, the step of transmitting the rearm instruction to the sensor includes controlling the BMC of the server to transmit the rearm instruction.

According to an embodiment of the present invention, after the step of transmitting the rearm instruction to the sensor, the sensor function testing method further includes obtaining a sensed value through the sensor again to determine whether the sensor is in the normal status.

According to an embodiment of the present invention, the step of triggering the sensor to enter or exit each of the failure statuses includes changing a determination standard of each of the failure statuses to allow the sensor to enter or exit the failure status.

The present invention also provides a computer program product including a plurality of program instructions. The program instructions are loaded into a server for executing following steps. First, a rearm type corresponding to a rearm function of a sensor in the server is obtained, wherein the sensor is in a normal status or one of a plurality of failure statuses. Then, the sensor is respectively triggered to enter and exit each of the failure statuses. If the rearm type is an auto rearm type and the sensor automatically returns to the normal status every time when the sensor is triggered to exit one of the failure statuses, the rearm function of the sensor is determined as normal. If the rearm type is a manual rearm type and the sensor only returns to the normal status after receiving a rearm instruction every time when the sensor is triggered to exit one of the failure statuses, the rearm function of the sensor is determined as normal.

As described above, in the present invention, a sensor in a server is respectively triggered to enter and exit each failure status, and whether the rearm function of the sensor works well is determined according to the rearm type of the rearm function and how the sensor returns to the normal status. Thereby, the rearm function of the sensor can be tested regarding all the failure statuses of the sensor, and besides, the rearm function of the sensor can be thoroughly tested regardless of whether the rearm function is corresponding to an auto rearm type or a manual rearm type.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
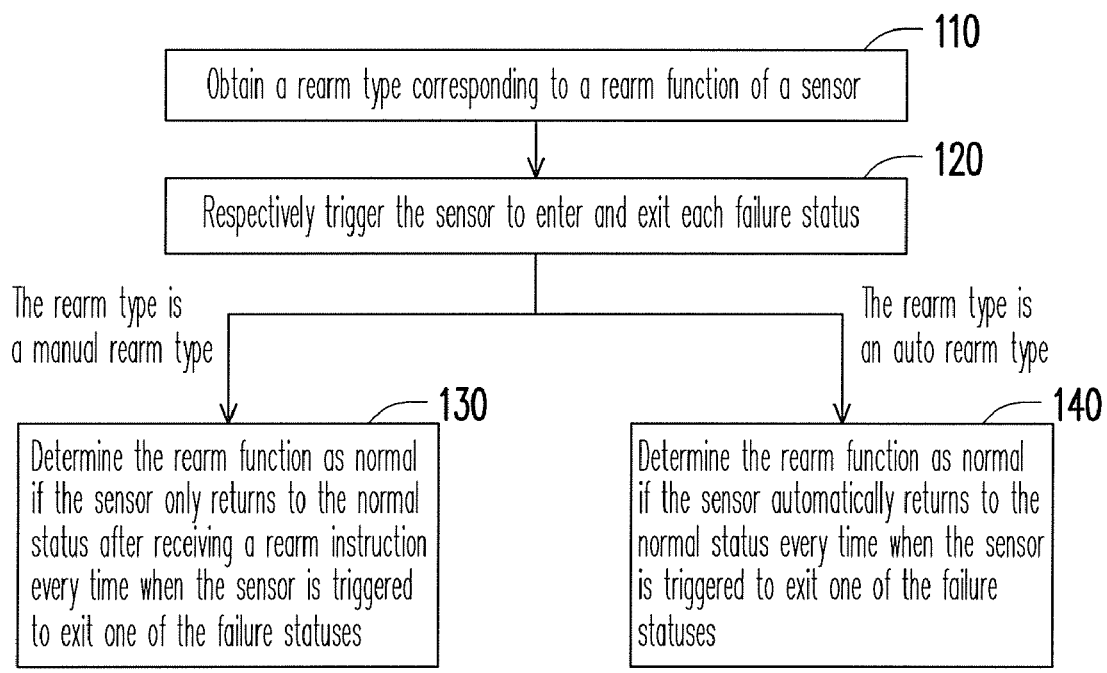
FIG. 1 is a flowchart of a sensor function testing method according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The detailed steps for testing a rearm function of a sensor in a server will be described below with reference to embodiments of the present invention. Herein the sensor may be used for detecting different environmental information in the server, such as temperature, voltage, fan speed, or power supply, and the type of the sensor is not limited in the present invention. The sensor can switch to different statuses according to the detected data and predetermined determination standards. In the present embodiment, the sensor has a normal status and at least one failure status. In addition, the rearm function for controlling the sensor to return from each failure status back to the normal status may be an auto rearm type function or a manual rearm type function according to different purpose and characteristic of the sensor.

FIG. 1 is a flowchart of a sensor function testing method according to an embodiment of the present invention. Referring to FIG. 1, first, in step 110, the rearm type corresponding to the rearm function of a sensor to be tested is obtained. In the present embodiment, a baseboard management controller (BMC) is disposed in the server, and a sensor data record (SDR) in the BMC records the rearm type of each sensor in the server and the normal status and failure statuses of the sensor. Thus, the rearm type of a sensor can be identified by reading the SDR, and meanwhile, the failure statuses of the sensor can also be obtained from the SDR. It should be mentioned that the sensor may be in the normal status or one of the failure statuses at a single time point.

Then, in step 120, the sensor is respectively triggered to enter and exit each of the failure statuses. The failure statuses of the sensor are corresponding to different determination standards, and the sensor may be triggered to enter or exit these failure statuses by changing the values of the corresponding determination standards. Taking a temperature sensor having one normal status and one failure status as an example, here it is assumed that the determination standard corresponding to the normal status is being lower than or equal to 10° C. and the determination standard corresponding to the failure status is being higher than 10° C. Accordingly, the temperature sensor is in the failure status when the temperature sensor detects a temperature of 12° C. However, if the determination standard corresponding to the normal status is changed to being lower than or equal to 15° C. and the determination standard corresponding to the failure status is changed to being higher than 15° C., the sensor is triggered to enter a different status after the values of the determination standards are changed.

If the realm type of the sensor is the manual rearm type and the sensor only returns to the normal status after receiving a rearm instruction every time when the sensor is triggered to exit one of the failure statuses, in step 130, the rearm function of the sensor is determined as normal. In other words, a sensor of the manual rearm type can only return to the normal status when it receives a rearm instruction issued by the system.

If the rearm type of the sensor is the auto rearm type and the sensor automatically returns to the normal status every time when the sensor is triggered to exit one of the failure statuses, in step 140, the rearm function is the sensor is determined as normal. Namely, a sensor of the auto rearm type should be able to automatically return to the normal status every time when the sensor is triggered to exit a failure status.

In the testing method illustrated in FIG. 1, different determination process is taken according to different rearm type of the sensor, and when the sensor is triggered to enter and exit each of the failure statuses, the performance of the rearm function of the sensor is determined according to the rearm type of the sensor, whether the sensor can return to the normal status, and whether the sensor automatically returns to the normal status or only returns to the normal status after receiving a rearm instruction. It should be noted that even though the rearm function of a single sensor is tested in the embodiment described above, the rearm functions of all the sensors in a server can be tested through the steps illustrated in FIG. 1. Namely, the rearm function of a sensor is not only tested regarding some failure statuses of the sensor. Accordingly, a more thorough testing result can be obtained through the method in the present invention.

Figure 2:
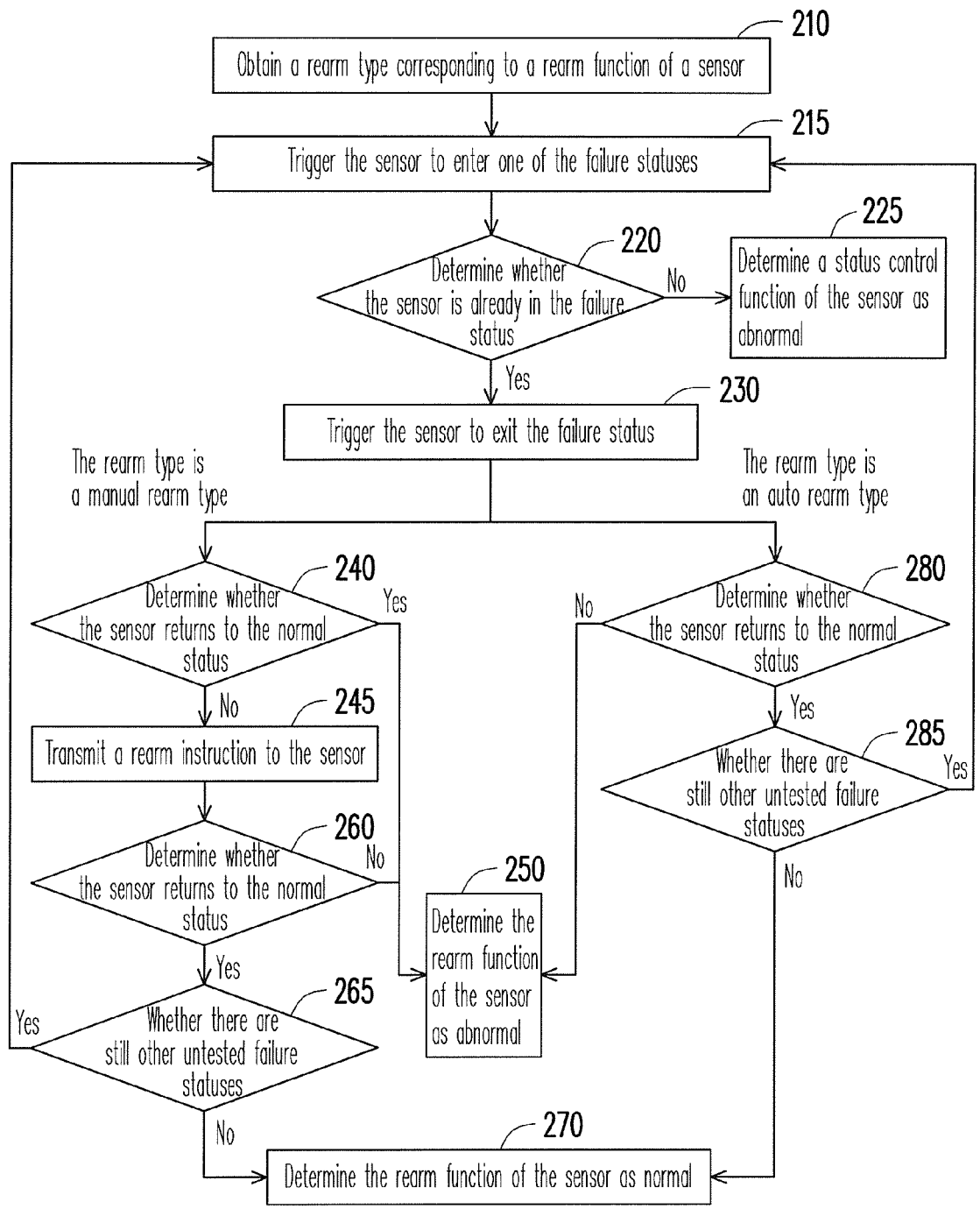
FIG. 2 is a flowchart of a sensor function testing method according to another embodiment of the present invention.

FIG. 2 is a flowchart of a sensor function testing method according to another embodiment of the present invention. In the present embodiment, the detailed steps for determining the performance of a rearm function according to whether the sensor of different rearm type can return to the normal status from different failure statuses will be further described. Referring to FIG. 2, first, in step 210, a rearm type corresponding to a rearm function of a sensor is obtained by reading the SDR in the BMC of a server. In the present embodiment, the rearm type may be an auto rearm type or a manual rearm type.

Because the sensor may be in one of at least one failure status or a normal status, in step 215, one of the failure statuses corresponding to the sensor is selected, and the sensor is triggered to enter the selected failure status. In the present embodiment, the sensor can be triggered to enter the failure status by changing the determination standard corresponding to the failure status.

Then, in step 220, whether the sensor is already in the failure status is determined. If the sensor is not in the failure status, in step 225, a status control function of the sensor is determined as abnormal and the testing method is terminated so that the rearm function of the sensor can be corrected.

If the sensor is already in the failure status, in step 230, the sensor is triggered to exit the failure status. The sensor may be triggered to exit the failure status by changing the determination standard corresponding to the failure status.

Thereafter, the rearm function of a sensor of different rearm type is tested according to different determination standards. In an embodiment of the present invention, assuming that the rearm type of the sensor is obtained as the manual rearm type in step 210, in step 240, whether the sensor automatically returns to the normal status is determined. Because the rearm type of the sensor is the manual rearm type, if the sensor returns to the normal status after it is triggered, in step 250, it is determined that the rearm function of the sensor produces an error when it restores the sensor from the failure status back to the normal status and the testing process is terminated.

However, if the sensor does not automatically return to the normal status after it is triggered to exit the failure status, in step 245, a rearm instruction is transmitted to the sensor. In the present embodiment, the BMC in the server is controlled to transmit the rearm instruction to the sensor. The sensor obtains a sensed value after it receives the rearm instruction, so as to determine whether the sensor is in the normal status.

Next, in step 260, whether the sensor returns to the normal status after it receives the rearm instruction is determined. If the sensor still cannot return to the normal status, in step 250, the rearm function of the sensor is determined as abnormal and the testing process is terminated. Namely, the rearm function of the sensor cannot restore the sensor from the tested failure status back to the normal status.

Contrarily, if the sensor is already in the normal status, in step 265, whether there are still other untested failure statuses is determined. If there are still untested failure statuses, the process returns to step 215 to obtain another failure status supported by the sensor, and foregoing steps are repeated to determine whether the rearm function of the sensor is abnormal. If all the failure statuses of the sensor have been tested and the sensor only returns to the normal status after receiving a rearm instruction every time when the sensor is triggered to exit one of the failure statuses, in step 270, the rearm function of the sensor is determined as normal. Namely, the rearm function of the sensor can restore the sensor from all the failure statuses it supports back to the normal status according to the rearm type of the sensor.

Back to step 230 in FIG. 2, if in another embodiment of the present invention, the rearm type of the sensor is the auto rearm type, in step 280, whether the sensor can return to the normal status after the sensor is triggered to exit the failure status is determined. If the sensor cannot automatically return to the normal status, in step 250, the rearm function of the sensor is determined as abnormal (i.e., the rearm function cannot restore the sensor from the failure status back to the normal status), and the testing process is terminated.

However, if the sensor can automatically return to the normal status after it is triggered to exit the failure status, in step 285, whether there are still other untested failure statuses is determined. If all the failure statuses of the sensor have been tested, in step 270, the rearm function of the sensor is determined to be able to restore the sensor from each failure status back to the normal status, and the testing process is ended. If there are still untested failure statuses, in step 215, another failure status supported by the sensor is obtained, and foregoing steps are repeated to test the rearm function of the sensor.

There may be hundreds of sensors in a server, and the rearm function of each of the sensors can be tested through the procedure illustrated in FIG. 2. In other words, the number of sensors, the rearm types of the sensors, and all the failure statuses supported by each sensor in the server can be obtained through the SDR in the BMC. Then, the sensor to be tested is triggered to enter and exit each of the failure statuses, and whether the rearm function of the sensor is normal is determined according to whether the situation that the sensor returns to the normal status meets the specification of the corresponding rearm type.

The present invention further provides a computer program product for executing the sensor function testing method described above. The computer program product is composed of at least one program instruction (for example, setting program instructions or deployment program instructions, etc). After the at least one program instruction is loaded into and executed by a server, the steps in the sensor function testing method described above are executed and accordingly the server can automatically test whether all the sensors therein can return to the corresponding normal statuses from the corresponding failure statuses.

As described above, the present invention provides a sensor function testing method and a computer program product thereof, wherein an automatic testing process is provided such that the rearm functions of all the sensors in a server can be tested, and whether a sensor can return to the normal status from each failure status it supports is determined according to the rearm type of the sensor. Accordingly, compared to the conventional technique wherein a rearm function of a sensor is tested regarding some of the corresponding failure statuses, a more reliable and thorough testing result can be obtained in the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A sensor function testing method, for testing a rearm function of a sensor in a server, wherein the sensor is in a normal status or one of at least one failure status, the sensor function testing method comprising:

obtaining a rearm type corresponding to the rearm function of the sensor;

respectively triggering the sensor to enter each of the at least one failure status, wherein the step of respectively triggering the sensor comprises:

determining whether the sensor is already in one of the at least one failure status after triggering the sensor to enter the failure status;

triggering the sensor to exit the failure status if the sensor is already in the failure status;

determining whether the sensor returns to the normal status;

determining the rearm function as abnormal if the rearm type is the auto rearm type and the sensor does not return to the normal status;

determining the rearm function as abnormal if the rearm type is the manual rearm type and the sensor automatically returns to the normal status; and determining a status control function of the sensor as abnormal if the sensor is not in the failure status;

triggering the sensor to exit the failure status;

determining the rearm function as normal if the rearm type is an auto rearm type and the sensor automatically returns to the normal status every time when the sensor is triggered to exit one of the at least one failure status; and determining the rearm function as normal if the rearm type is a manual rearm type and the sensor only returns to the normal status after receiving a rearm instruction every time when the sensor is triggered to exit one of the at least one failure status.

2. The sensor function testing method according to claim 1, wherein the server comprises a baseboard management controller (BMC), and the step of obtaining the rearm type corresponding to the rearm function comprises:

reading a sensor data record (SDR) in the BMC to identify the rearm type.

3. The sensor function testing method according to claim 2, wherein the SDR further records a mapping relationship between the sensor and the normal status and the at least one failure status.

4. The sensor function testing method according to claim 1, wherein after the step of determining whether the sensor returns to the normal status, the sensor function testing method further comprises:

transmitting the rearm instruction to the sensor if the rearm type is the manual rearm type and the sensor does not return to the normal status; and determining the rearm function as abnormal when the sensor receives the rearm instruction and cannot return to the normal status.

5. The sensor function testing method according to claim 4, wherein the step of transmitting the rearm instruction to the sensor comprises:

controlling a baseboard management controller (BMC) of the server to transmit the rearm instruction.

6. The sensor function testing method according to claim 4, wherein after the step of transmitting the rearm instruction to the sensor, the sensor function testing method further comprises:

obtaining a sensed value through the sensor again to determine whether the sensor is in the normal status.

7. The sensor function testing method according to claim 1, wherein the step of triggering the sensor to enter or exit each of the at least one failure status comprises:

changing a determination standard of each of the at least one failure status to allow the sensor to enter or exit each of the at least one failure status.

8. A computer program product embodied on a non-transitory computer readable medium, comprising at least one program instruction, wherein the at least one program instruction is loaded into a server to execute following steps:

obtaining a rearm type corresponding to a rearm function of a sensor in the server, wherein the sensor is in a normal status or one of at least one failure status;

respectively triggering the sensor to enter each of the at least one failure status, wherein the step of respectively triggering the sensor comprises:

determining whether the sensor is already in one of the at least one failure status after triggering the sensor to enter the failure status;

triggering the sensor to exit the failure status if the sensor is already in the failure status;

determining whether the sensor returns to the normal status;

determining the rearm function as abnormal if the rearm type is the auto rearm type and the sensor does not return to the normal status;

determining the rearm function as abnormal if the rearm type is the manual rearm type and the sensor automatically returns to the normal status; and determining a status control function of the sensor as abnormal if the sensor is not in the failure status;

triggering the sensor to exit the failure status;

determining the rearm function as normal if the rearm type is an auto rearm type and the sensor returns to the normal status every time when the sensor is triggered to exit one of the at least one failure status; and determining the rearm function as normal if the rearm type is a manual rearm type and the sensor only returns to the normal status after receiving a rearm instruction every time when the sensor is triggered to exit one of the at least one failure status.

9. The computer program product according to claim 8, wherein the server comprises a baseboard management controller (BMC), and when the at least one program instruction obtain the rearm type corresponding to the rearm function, the at least one program instruction reads a sensor data record (SDR) in the BMC to identify the rearm type.

10. The computer program product according to claim 9, wherein the SDR further records a mapping relationship between the sensor and the normal status and the at least one failure status.

11. The computer program product according to claim 8, wherein after the at least one program instruction determines whether the sensor returns to the normal status, the at least one program instruction further transmits the rearm instruction to the sensor if the rearm type is the manual rearm type and the sensor does not return to the normal status and determine the rearm function as abnormal when the sensor receives the rearm instruction and cannot return to the normal status.

12. The computer program product according to claim 11, wherein when the at least one program instruction transmits the rearm instruction to the sensor, the at least one program instruction controls a baseboard management controller (BMC) of the server to transmit the rearm instruction.

13. The computer program product according to claim 11, wherein after the at least one program instruction transmits the rearm instruction to the sensor, the at least one program instruction further obtains a sensed value through the sensor again to determine whether the sensor is in the normal status.

14. The computer program product according to claim 8, wherein when the at least one program instruction triggers the sensor to enter or exit each of the at least one failure status, the at least one program instruction changes a determination standard of each of the at least one failure status to allow the sensor to enter or exit the at least one failure status.

* * * * *